United States Patent
Hwang et al.

(10) Patent No.: US 12,323,694 B2
(45) Date of Patent: Jun. 3, 2025

(54) COMPOSITE IMAGE SIGNAL PROCESSOR

(71) Applicant: QUALCOMM Incorporated, San Diego, CA (US)

(72) Inventors: Hau Hwang, San Diego, CA (US); Shusil Dangi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/447,978

(22) Filed: Aug. 10, 2023

(65) Prior Publication Data
US 2023/0388623 A1 Nov. 30, 2023

Related U.S. Application Data

(63) Continuation of application No. 17/351,967, filed on Jun. 18, 2021, now Pat. No. 11,778,305.

(51) Int. Cl.
*H04N 23/62* (2023.01)
*G06T 3/4015* (2024.01)
*H04N 23/80* (2023.01)

(52) U.S. Cl.
CPC ........... *H04N 23/62* (2023.01); *G06T 3/4015* (2013.01); *H04N 23/80* (2023.01)

(58) Field of Classification Search
CPC ...... H04N 23/62; H04N 23/80; G06T 3/4015; G06T 2207/10004; G06T 2207/20012; G06T 2207/20084; G06T 5/007; G06T 5/20; G06T 5/001
See application file for complete search history.

(56) References Cited

U.S. PATENT DOCUMENTS

| 10,692,189 | B2  | 6/2020  | Mentl et al. |
| 11,315,227 | B2* | 4/2022  | Baek ........................ G06T 5/70 |
| 11,522,688 | B2* | 12/2022 | Goodsitt ............ G11B 5/00813 |
| 11,645,787 | B2* | 5/2023  | Walters .................. G06V 10/44 382/157 |

(Continued)

OTHER PUBLICATIONS

Chen C., et al., "Learning to See in the Dark", Eye In-Painting with Exemplar Generative Adversarial Networks, Jun. 1, 2018, XP055896775, pp. 3291-3300, Figure 3 Abstract.

(Continued)

*Primary Examiner* — Hung H Lam
(74) *Attorney, Agent, or Firm* — QUALCOMM Incorporated; Scott Barker

(57) ABSTRACT

Systems and techniques are described for image processing. An imaging system can include an image sensor that captures image data. An image signal processor (ISP) of the imaging system can demosaic the image data. The imaging system can input the image data into one or more trained machine learning models, in some cases along with metadata associated with the image data. The one or more trained machine learning models can output settings for a set of parameters of the ISP based on the image data and/or the metadata. The imaging system can generate an output image by processing the image data using the ISP, with the parameters of the ISP set according to the settings. Each pixel of the pixels of the image data can be processed using a respective setting for adjusting a corresponding parameter. The parameters of the ISP can include gain, offset, gamma, and Gaussian filtering.

30 Claims, 8 Drawing Sheets

(56) References Cited

U.S. PATENT DOCUMENTS

| | | | |
|---|---|---|---|
| 11,893,497 B2* | 2/2024 | Choi | G06T 5/20 |
| 11,948,279 B2* | 4/2024 | Kurmanov | G06T 5/60 |
| 2018/0268526 A1 | 9/2018 | Mentl et al. | |
| 2019/0043172 A1 | 2/2019 | Chui et al. | |
| 2019/0108618 A1 | 4/2019 | Hwang et al. | |
| 2020/0364833 A1* | 11/2020 | Zhao | G06T 5/00 |
| 2020/0401889 A1* | 12/2020 | Lee | G06N 3/044 |
| 2021/0360179 A1 | 11/2021 | Dangi et al. | |
| 2022/0164926 A1 | 5/2022 | Kurmanov et al. | |
| 2022/0408012 A1 | 12/2022 | Hwang et al. | |

OTHER PUBLICATIONS

Fu Q., et al., "Learning an Adaptive Model for Extreme Low-light Raw Image Processing", Arxiv.Org, Cornell University Library, 201 Olin Library Cornell University Ithaca, NY 14853, Apr. 22, 2020, XP081650255, pp. 1-11, Abstract Sections 1, 6.1 Figure 3.

International Search Report and Written Opinion—PCT/US2022/032741—ISA/EPO—Oct. 11, 2022.

Moran S., et al., "DeepLPF: Deep Local Parametric Filters for Image Enhancement", arxiv.org, Cornell University Library, 201 Olin Library Cornell University Ithaca, NY, 14853, Mar. 31, 2020 (Mar. 31, 2020), XP081635406, 10 Pages, Abstract, Figures 1-5 pp. 3-5.

* cited by examiner

303

| V7 | V15 | V23 | V31 | V39 | V47 | V55 | V63 |
|---|---|---|---|---|---|---|---|
| V6 | V14 | V22 | V30 | V38 | V46 | V54 | V62 |
| V5 | V13 | V21 | V29 | V37 | R45 | R53 | V61 |
| V4 | V12 | V20 | V28 | V36 | V44 | V52 | V60 |
| V3 | V11 | V19 | V27 | V35 | V43 | V51 | V59 |
| V2 | V10 | V18 | V26 | V34 | V42 | V50 | V58 |
| V1 | V9 | V17 | V25 | V33 | V41 | V49 | V57 |
| V0 | V8 | V16 | V24 | V32 | V40 | V48 | V56 |

| P7 | P15 | P23 | P31 | P39 | P47 | P55 | P63 |
|---|---|---|---|---|---|---|---|
| P6 | P14 | P22 | P30 | P38 | P46 | P54 | P62 |
| P5 | P13 | P21 | P29 | P37 | P45 | P53 | P61 |
| P4 | P12 | P20 | P28 | P36 | P44 | P52 | P60 |
| P3 | P11 | P19 | P27 | P35 | P43 | P51 | P59 |
| P2 | P10 | P18 | P26 | P34 | P42 | P50 | P58 |
| P1 | P9 | P17 | P25 | P33 | P41 | P49 | P57 |
| P0 | P8 | P16 | P24 | P32 | P40 | P48 | P56 |

FIG. 3A

COMPOSITE IMAGE SIGNAL PROCESSOR

CROSS-REFERENCE TO RELATED APPLICATIONS

This application is a continuation of U.S. Non-Provisional application Ser. No. 17/351,967, filed Jun. 18, 2021, which is hereby incorporated by reference, in its entirety and for all purposes.

FIELD

The present disclosure generally relates to image processing, and more specifically to systems and techniques for processing image data using a composite image signal processor (ISP) that uses one or more trained machine learning models to identify custom settings for different pixels of the image data.

BACKGROUND

A camera is a device that receives light and captures image frames, such as still images or video frames, using an image sensor. Cameras may include processors, such as image signal processors (ISPs), that can receive one or more image frames and process the one or more image frames. For example, a raw image frame captured by a camera sensor can be processed by an ISP to generate a final image. Cameras can be configured with a variety of image capture and image processing settings to alter the appearance of an image. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors.

Traditional image signal processors (ISPs) have separate discrete blocks that address the various partitions of the image-based problem space. For example, a typical ISP has discrete functional blocks that each apply a specific operation to raw camera sensor data to create a final output image. Such functional blocks can include blocks for demosaicing, noise reduction (denoising), color processing, tone mapping, among many other image processing functions. Each of these functional blocks contains many pre-tuned parameters, resulting in an ISP with a large number of pre-tuned parameters (e.g., over 10,000) that must be re-tuned according to the tuning preference of each customer. Such hand-tuning of parameters is very time-consuming and expensive, and thus is generally performed once. Once tuned, a traditional ISP generally uses a limited set of tuning settings for processing images. For example, there may be one set of tuning settings for processing low light images, and a second set of tuning settings for processing bright light images. For any individual image, a static tuning setting is used for processing the full image.

SUMMARY

In some examples, systems and techniques are described for processing image data using a composite image signal processor (ISP) that uses one or more trained machine learning models to identify custom settings for different pixels of the image data for each scene. An imaging system can include an image sensor that captures image data and an image signal processor (ISP) that processes the image data. For instance, the ISP of the imaging system can demosaic the image data and/or perform one or more other functions on the image data based on one or more settings with which the ISP is pre-configured or tuned. The imaging system can use one or more machine learning models (e.g., one or more trained neural networks or other type of machine learning model) to determine or adjust settings for ISP functions other than the function(s) (e.g., demosaicing and/or other functions) the ISP is pre-configured or tuned to perform. For instance, the imaging system can input the image data into the one or more machine learning models, in some cases along with metadata associated with the image data. The one or more trained machine learning models can output settings for a set of parameters of the ISP based on the image data and/or the metadata. In some cases, the settings can be used to adjust or fine-tune a previously tuned or initialized value of a parameter of the set of parameters of the ISP (e.g., after tuning of the ISP is previously performed, such as by an original equipment manufacturer, etc.).

The imaging system can generate an output image by processing the image data using the ISP, with the parameters of the ISP set or adjusted according to the settings. The settings provided by the machine learning model(s) are spatially varying, allowing each pixel to be modified based on a parameter that is set or adjusted using the settings. For example, each pixel of the pixels of the image data can be processed using a respective setting for adjusting a corresponding parameter (e.g., adjusting a gain setting for a particular pixel). Using spatially varying settings and parameters provides advantages (e.g., better output image quality, etc.) over using a static tuning setting for processing the full image. In some examples, the parameters of the ISP can include parameters for gain, offset, gamma, and Gaussian filtering. In one example, the ISP can apply gain settings for one or more gain parameters (e.g., that can correspond to different color channels) to one or more pixels using a multiplier. In another example, the ISP can apply offset settings for one or more offset parameters (e.g., that can correspond to different color channels) to one or more pixels using an adder. In another example, the ISP can apply a gamma settings for a gamma parameter to one or more pixels using a tone adjuster. In another example, the ISP can apply Gaussian filter settings for one or more Gaussian filter parameters (e.g., that can define a shape of a Gaussian curve) to one or more pixels using a Gaussian filter.

In one example, an apparatus for image processing is provided. The apparatus includes a memory and one or more processors (e.g., implemented in circuitry) coupled to the memory. The one or more processors are configured to and can: obtain image data associated with an image frame; determine a plurality of settings for adjusting one or more parameters of an image signal processor (ISP) based on an output of one or more trained machine learning models that use the image data as input, wherein the plurality of settings spatially vary across the image data; and generate an output image at least in part by processing a plurality of pixels of the image data using the ISP, wherein each pixel of the plurality of pixels is processed using a respective setting of the plurality of settings for adjusting a corresponding parameter of the one or more parameters.

In another example, a method of image processing is provided. The method includes: obtaining image data associated with an image frame; determining a plurality of settings for adjusting one or more parameters of an image signal processor (ISP) based on an output of one or more trained machine learning models that use the image data as input, wherein the plurality of settings spatially vary across the image data; and generating an output image at least in part by processing a plurality of pixels of the image data using the ISP, wherein each pixel of the plurality of pixels is processed using a respective setting of the plurality of settings for adjusting a corresponding parameter of the one or more parameters.

In another example, a non-transitory computer-readable medium is provided that has stored thereon instructions that, when executed by one or more processors, cause the one or more processors to: obtain image data associated with an image frame; determine a plurality of settings for adjusting one or more parameters of an image signal processor (ISP) based on an output of one or more trained machine learning models that use the image data as input, wherein the plurality of settings spatially vary across the image data; and generate an output image at least in part by processing a plurality of pixels of the image data using the ISP, wherein each pixel of the plurality of pixels is processed using a respective setting of the plurality of settings for adjusting a corresponding parameter of the one or more parameters.

In another example, an apparatus for image processing is provided. The apparatus includes: means for obtaining image data associated with an image frame; means for determining a plurality of settings for adjusting one or more parameters of an image signal processor (ISP) based on an output of one or more trained machine learning models that use the image data as input, wherein the plurality of settings spatially vary across the image data; and means for generating an output image at least in part by processing a plurality of pixels of the image data using the ISP, wherein each pixel of the plurality of pixels is processed using a respective setting of the plurality of settings for adjusting a corresponding parameter of the one or more parameters.

In some aspects, the image data includes demosaiced image data

In some aspects, the image data is raw image data having a plurality of color components corresponding to a color filter array of an image sensor.

In some aspects, input of the image data to the one or more trained machine learning models includes input of the raw image data to the one or more trained machine learning models.

In some aspects, to generate the output image, the methods, apparatuses, and computer-readable medium described above further comprise: demosaicing the image data before processing the plurality of pixels of the image data using the ISP with each of the one or more parameters adjusted based on the plurality of settings.

In some aspects, the methods, apparatuses, and computer-readable medium described above further comprise: demosaicing the image data before input of the image data to the one or more trained machine learning models.

In some aspects, to obtain the image data, the methods, apparatuses, and computer-readable medium described above further comprise: receiving the image data from an image sensor that captures the image data.

In some aspects, the methods, apparatuses, and computer-readable medium described above further comprise: obtaining metadata corresponding to the image data. In such aspects, the output of the one or more trained machine learning models is based on input of the metadata and the image data to the one or more trained machine learning models.

In some aspects, the one or more parameters of the ISP include a plurality of gain parameters and the plurality of settings include a plurality of gain settings corresponding to the plurality of gain parameters. In such aspects, each gain parameter of the plurality of gain parameters corresponds to one of a plurality of color channels. To process the plurality of pixels of the image data using the ISP, the ISP is configured to perform one or more multiplier operations for at least one pixel based on the plurality of gain settings.

In some aspects, the one or more parameters of the ISP include a plurality of offset parameters and the plurality of settings include a plurality of offset settings corresponding to the plurality of offset parameters. In such aspects, each offset parameter of the plurality of offset parameters corresponding to one of a plurality of color channels, wherein, to process the plurality of pixels of the image data using the ISP, the ISP is configured to perform one or more addition operations for at least one pixel based on the plurality of offset settings.

In some aspects, the one or more parameters of the ISP include one or more gamma parameters and the plurality of settings include one or more gamma settings corresponding to the one or more gamma parameters. In such aspects, to process the plurality of pixels of the image data using the ISP, the ISP is configured to adjust tone of at least one pixel based on the one or more gamma settings.

In some aspects, the one or more parameters of the ISP include one or more Gaussian filter parameters and the plurality of settings include one or more Gaussian filter settings corresponding to the one or more Gaussian filter parameters. In such aspects, to process the plurality of pixels of the image data using the ISP, the ISP is configured to apply a Gaussian filter to at least one pixel based on a Gaussian curve. A shape of the Gaussian curve is based on the one or more Gaussian filter settings.

In some aspects, the one or more parameters of the ISP include one or more demosaicing parameters and the plurality of settings include one or more demosaicing settings corresponding to the one or more demosaicing parameters. In such aspects, to process the plurality of pixels of the image data using the ISP, the ISP is configured to demosaic at least one pixel of the image data based on the one or more demosaicing settings.

In some aspects, the one or more parameters of the ISP are associated with at least one of noise reduction, sharpening, tone mapping, and color saturation.

In some aspects, to process the plurality of pixels of the image data using the ISP with each of the one or more parameters adjusted based on the plurality of settings, the methods, apparatuses, and computer-readable medium described above further comprise: processing a first pixel of the plurality of pixels of the image data based on a first setting for a first parameter of the one or more parameters; and processing a second pixel of the plurality of pixels of the image data based on a second setting for the first parameter, wherein the plurality of settings include at least the first setting and the second setting.

In some aspects, to process the plurality of pixels of the image data using the ISP with each of the one or more parameters adjusted based on the plurality of settings, the methods, apparatuses, and computer-readable medium described above further comprise: processing a first pixel of the plurality of pixels of the image data based on a first setting for a first parameter of the one or more parameters; and processing the first pixel of the plurality of pixels based on a second setting corresponding to a second parameter of the one or more parameters, wherein the plurality of settings include at least the first setting and the second setting.

In some aspects, the methods, apparatuses, and computer-readable medium described above further comprise: displaying the output image on one or more displays (e.g., of the apparatus or other device).

In some aspects, the one or more trained machine learning models include one or more trained neural networks.

In some aspects, each of the apparatuses or devices described above is, can be part of, or can include an extended reality (XR) device (e.g., a virtual reality (VR) device, an augmented reality (AR) device, or a mixed reality (MR) device), a smart device or assistant, a vehicle, a mobile device (e.g., a mobile telephone or so-called "smart phone" or other mobile device), a wearable device, a personal computer, a laptop computer, a tablet computer, a server computer, or other device. In some aspects, the apparatus or device includes an image sensor (e.g., a camera) or multiple image sensors (e.g., multiple cameras) for capturing one or more images. In some aspects, the apparatus or device includes one or more displays for displaying one or more images, notifications, and/or other displayable data. In some aspects, the apparatus or device includes one or more speakers, one or more light-emitting devices, and/or one or more microphones. In some aspects, the apparatuses or devices described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 3A is a conceptual diagram illustrating an example of an input image that includes a plurality of pixels labeled P0 through P63, in accordance with some examples;

FIG. 3B is a conceptual diagram illustrating an example of a settings map mapping spatially varying settings corresponding to each of the pixels of the input image of FIG. 3A, in accordance with some examples;

DETAILED DESCRIPTION

Figure 1:
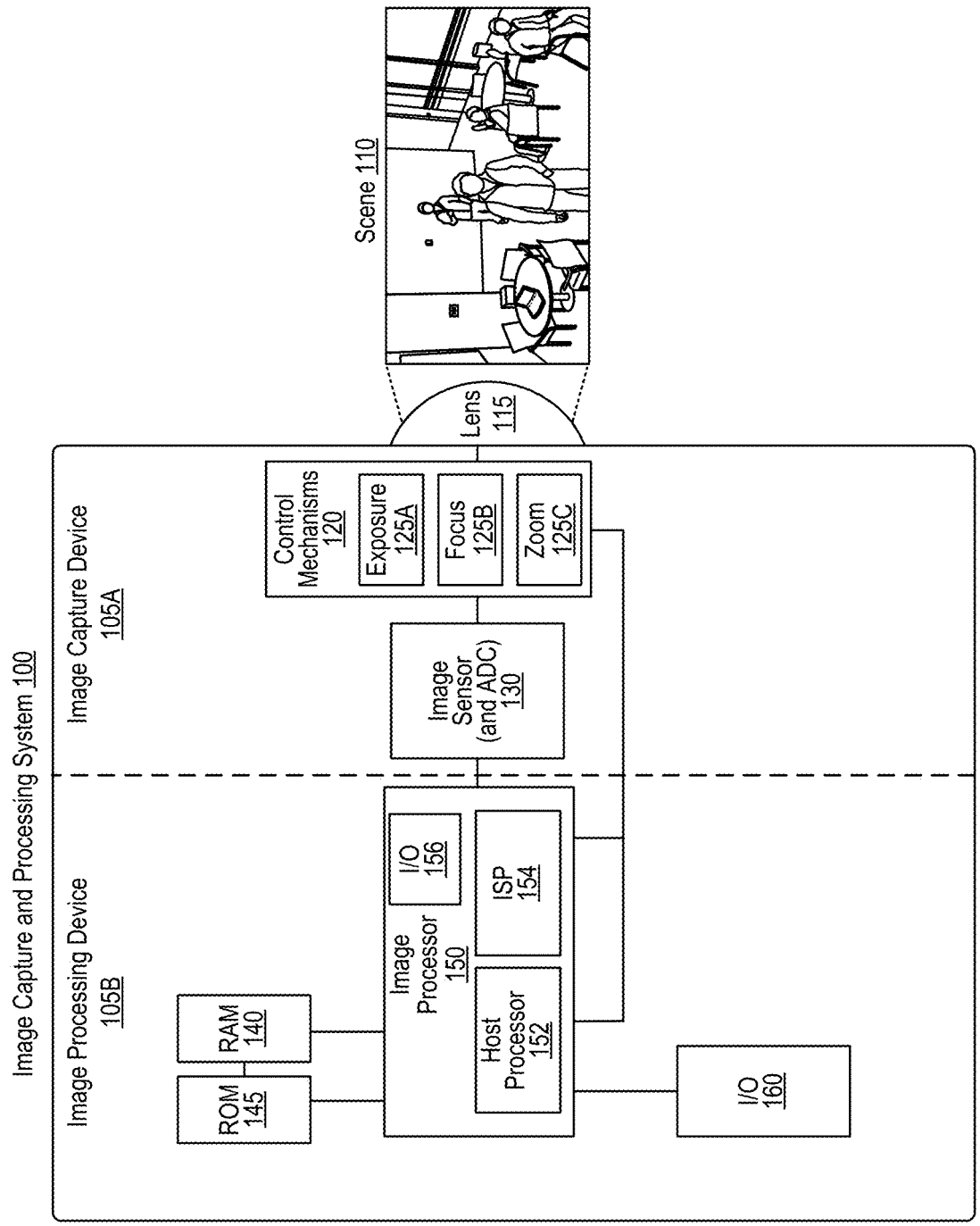
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Image capture devices capture images by receiving light from a scene using an image sensor with an array of photodiodes. An image signal processor (ISP) then processes the raw image data captured by the photodiodes of the image sensor into an image that can be stored and viewed by a user. How the scene is depicted in the image depends in part on capture settings that control how much light is received by the image sensor, such as exposure time settings and aperture size settings. How the scene is depicted in the image also depends on how the ISP is tuned to process the photodiode data captured by the image sensor into an image.

The ISP's processing of the raw image data can include demosaicing the raw image data, which merges data from different color components (e.g., red, green, blue) of a color filter array (CFA) into pixels that each have multiple color channels (e.g., red, green, blue) and are thus able to reproduce colors from across the color spectrum. The ISP can also perform other types of processing based on parameters of the ISP, which can include, for example, noise reduction, sharpening, tone mapping, and color saturation. The ISP can generate the image from the raw image data differently based on how certain parameters of the ISP are tuned.

Traditionally, an ISP of an image capture device is only tuned once, during manufacturing. The tuning of the ISP affects how every image is processed in that image capture device. The tuning of the ISP generally uniformly affects every pixel of every image. Users typically expect image capture devices to capture high quality images regardless of what scene is photographed. To avoid situations where an image capture device cannot properly photograph certain types of scenes, the tuning of ISPs is generally selected to work reasonably well for as many types of scenes as possible. Because of this, however, the tuning of traditional ISPs is generally not optimal for photographing all types of scenes.

An ISP can be designed to use one or more trained machine learning (ML) models (e.g., trained neural networks (NNs) and/or other trained ML models). For example, a fully ML-based ISP can pass raw image data into one or more neural networks (or other trained ML models), which can output an image that can be stored and viewed by a user. An ML-based ISP can be more customizable than a pre-tuned ISP. For example, an ML-based ISP can process different images in different ways, for instance based on the different scenes depicted in the different images. However, a fully ML-based ISP can also require a higher silicon area than a pre-tuned ISP due to a large number of components required to perform quick image processing. A fully ML-based ISP also requires heavy computational resources, as many pixels need to be processed. A fully ML-based ISP can therefore draw heavily from limited battery life and computational resources. Thus, use of a fully ML-based ISP by devices with limited battery life and computational resources, such as mobile devices, may result in reductions to the already-limited battery lives of these devices, slowdowns in computing abilities of these devices, and the like. Similarly, a fully ML-based ISP may occupy a significant amount of space in devices with limited space for internal electronics, such as mobile devices. In some cases, a fully ML-based ISP can be inefficient for certain ISP tasks—for instance, a convolutional neural network (CNN) can be less efficient at performing tonal adjustment than pre-tuned ISP components.

Systems, apparatuses, processes (also referred to as methods), and computer-readable media (collectively referred to herein as "systems and techniques") are described herein for providing a composite (or hybrid) ISP that incorporates some aspects of a pre-tuned ISP and some aspects of a ML-based ISP. The composite ISP can provide a good balance of customization and efficiency. For instance, the composite ISP includes a trained ML system with one or more trained ML models (e.g., one or more trained NNs). In some cases, the trained ML system can receive, as input, image data from an image, an image patch of an image (e.g., including a patch or array of pixels from the image), metadata from the image capture process, or any combination thereof. The metadata can include, for example, automatic white balance (AWB), analog gain, digital gain, ISO, radial distance, other metadata, or any combination thereof.

The trained ML system can identify custom ISP settings for different parameters of the ISP for different images. For example, custom settings determined by the trained ML system for one or more images can be output to one or more non-ML ISP components of the ISP, such as a multiplier, an adder, a tone engine, and/or a Gaussian filter. The non-ML ISP components can perform one or more processing operations on the one or more images based on the custom settings, and can provide processing effects such as noise reduction, sharpening, tone mapping, color saturation, or combinations thereof. In some cases, the trained ML system can identify custom settings for different portions of a single image, so that the settings are spatially varied across the image. For instance, the trained ML system can generate a first custom setting for an ISP parameter for a first pixel of an image, while the trained ML system can generate a second custom setting for the same ISP parameter for a second pixel of the same image.

In some examples, the operations and/or functions of the ISP can be simplified. For instance, the operations of the ISP can include a multiplier, an adder, a tone adjuster, and a Gaussian filter. In some examples, the trained ML system outputs different settings for the various parameters corresponding to each operation. In some examples, the trained ML system can output three gain settings corresponding to three gain parameters for the multiplier—one setting each for a red channel gain parameter, a green channel gain parameter, and a blue channel gain parameter. In some examples, the trained ML system outputs three offset settings for three offset parameters of the adder—one each for a red channel offset parameter, a green channel offset parameter, and a blue channel offset parameter. In some examples, the trained ML system outputs one gamma value setting for a gamma parameter for the tone adjuster, which can be shared among the red, green, and blue channels. In some examples, the trained ML system outputs four settings for four parameters of the Gaussian filter, which can specify Gaussian curve for a Gaussian filter (e.g., a 5×5 Gaussian filter) that can be shared among the red, green, and blue channels.

Using such a composite ISP can provide a variety of technical improvements over pre-tuned ISPs and fully ML-based ISPs alike. For example, the composite ISP described herein represents a technical improvement over pre-tuned ISPs that are restricted to uniform settings because the composite ISP can provide different, image-optimized settings for different images. In another example, the composite ISP provides a technical improvement over pre-tuned ISPs that are restricted to uniform settings because the composite ISP can provide different, image-region-optimized, settings for different regions of each image. In such examples, the composite ISP is more customizable and flexible than pre-tuned ISPs. The composite ISP also represents a technical improvement over fully ML-based ISPs because the composite ISP can occupy a smaller silicon area than a fully ML-based ISP. In addition, the composite ISP provides a technical improvement over fully ML-based ISPs because the composite ISP can be more efficient in battery usage than a fully ML-based ISP. Further, the composite ISP represents a technical improvement over fully ML-based ISPs because the composite ISP can be more efficient in computational resource usage than a fully ML-based ISP. The composite ISP provides further technical improvement over fully ML-based ISPs because the composite ISP can efficiently perform pixel processing tasks that fully ML-based ISPs are inefficient at performing, such as tonal adjustments among others.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 710 discussed with respect to the computing device 700. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as demosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/5020, read-only memory (ROM) 145/5025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 735, any other input devices 745, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Systems, apparatuses, processes, and computer-readable media are described herein for an imaging system 200 with a specialized composite variant of the ISP 154 having an ISP 220 and a trained machine learning system 210. The trained machine learning system 210 generates custom settings 275 based on image data, and provides the settings 275 to different operators (e.g., multiplier 230, adder 240, tone adjuster 250, and Gaussian filter 260) of the ISP 220. The settings 275 set values for certain parameters of the operators of the ISP 220 that control how the operators of the ISP 220 are applied to the image data.

Figure 2A:
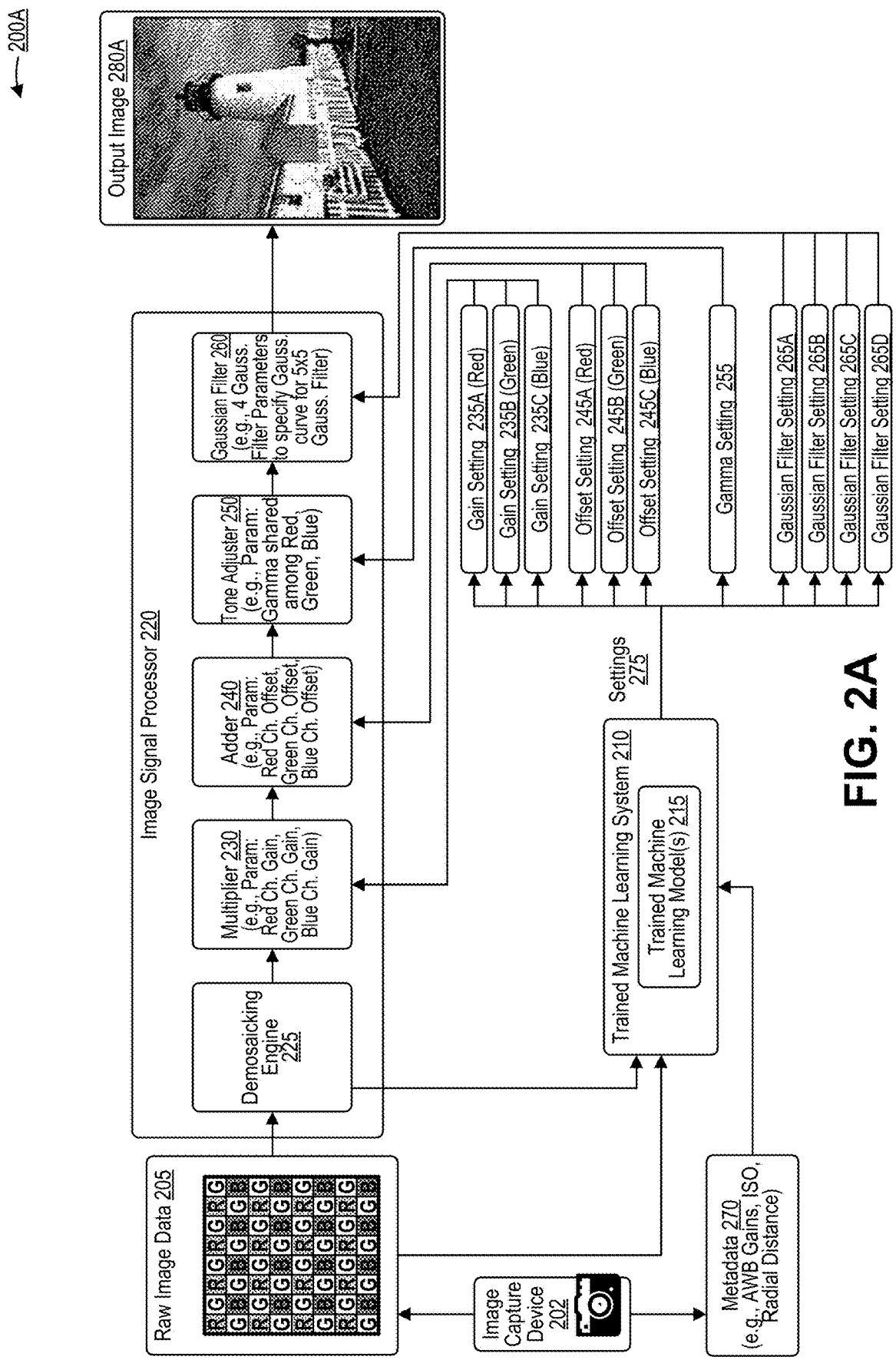
FIG. 2A is a block diagram illustrating an example architecture of an imaging system with an image signal processor (ISP) that is set or adjusted according to settings generated using a trained machine learning system, in accordance with some examples.

FIG. 2A is a block diagram illustrating an example architecture of an imaging system 200A with an image signal processor (ISP) 220 that is set or adjusted according to settings 275 generated using a trained machine learning system 210, in accordance with some examples. The imaging system 200 includes an image capture device 202 that captures raw image data 205. The image capture device 202 can be an example of an image capture device 105A. The image capture device 202 can include, for example, an image sensor 130 and/or one or more control mechanisms 120. A representation of the raw image data 205 is depicted, including pixels with a single color component (e.g., red, green, or blue) each, with each color component corresponding to a color component of a color filter array (CFA) of the image capture device 202. The image capture device 202 also obtains metadata 270 associated with the raw image data 205, and/or associated with capture of the raw image data 205. The metadata 270 can identify, for example a time and/or date of capture of the raw image data 205 by the image capture device 202, as well as various image capture settings for the image sensor 130 and/or the control mechanisms 120, such as aperture size, shutter speed, exposure time, ISO, zoom, focus, analog gain, digital gain, automatic white balance (AWB) gain, radial distance from the center of the image (which can identify radial lens distortion), or a combination thereof.

The imaging system 200A includes an ISP 220 with a demosaicing engine 225. The demosaicing engine 225 can receive the raw image data 205 as an input, and can demosaic the raw image data 205 to generate demosaiced image data. To demosaic the raw image data 205, demosaicing engine 225 can merge color information from multiple adjacent pixels of the raw image data 205 that each represent different color components into a single pixel. Each pixel of the demosaiced image data may include different color channels corresponding to the different color components of the raw image data 205.

The ISP 220 of the imaging system 200A also includes four operators that modify the demosaiced image data to ultimately generate the output image 280A, which in the example of FIG. 2A depicts a building with a lighthouse tower. The four operators include a multiplier 230, an adder 240, a tone adjuster 250, and a Gaussian filter 260. The multiplier 230 can modify gain in the image data. In some examples, the multiplier 230 can include three gain parameters, which can each be individually set to respective settings to affect how the multiplier 230 modifies gain in the image data. In some examples, the three gain parameters for the multiplier 230 can each correspond to one of the colors components of the CFA of the image capture device 202, for instance including a red channel gain parameter controlling gain adjustments for the red channel of the image data, a green channel gain parameter controlling gain adjustments for the green channel of the image data, and a blue channel gain parameter controlling gain adjustments for the blue channel of the image data.

The adder 240 can modify one or more offsets in the image data. In some examples, the adder 240 can include three offset parameters, which can each be individually set to respective settings to affect how the adder 240 modifies offsets in the image data. In some examples, the three offset parameters for the adder 240 can each correspond to one of the colors components of the CFA of the image capture device 202, for instance including a red channel offset parameter controlling offset adjustments for the red channel of the image data, a green channel offset parameter controlling offset adjustments for the green channel of the image data, and a blue channel offset parameter controlling gain adjustments for the blue channel of the image data. In some examples, the offset may be referred to as a cut or a bias.

The tone adjuster 250 can modify tone in the image data. In some examples, the tone adjuster 250 can include a single gamma parameter that controls tone adjustments across all color channels (e.g., across the red, green, and blue channels).

The Gaussian filter 260 can apply Gaussian blur (also referred to as Gaussian smoothing) to regions of the image data. In some examples, the Gaussian filter 260 can include four Gaussian filter parameters that can define a shape of a Gaussian curve that controls how the Gaussian filter 260 applies the Gaussian blur to regions of the image data across all color channels (e.g., across the red, green, and blue channels). In some examples, the Gaussian filter 260 can apply a 5×5 Gaussian filter. Other sized Gaussian filters can be used in other examples. The four parameters for the 2D Gaussian filter can include: 2 eigenvalues of the Gaussian covariance matrix, along with an angle x to parameterize the direction of the eigenvectors [cos x, sin x] and [sin x, −cos x]. A fourth term is a sharpening factor denoted y. The Gaussian filter provides smoothing, and so sharpening can be achieved by performing the following function:

$$I=I+y(I-\text{smoothed})  \hspace{2cm} \text{Equation (1)}$$

where y is the sharpening factor, I is the original image, and "smoothed" is the Gaussian smoothed version of I. I−smoothed represents the high frequency information. Thus, using equation (1), the sharpening can be achieved by adding I—smoothed multiplied by the sharpening factor y back to the original image I.

While the operators in the example of FIG. 2A include the multiplier 230, the adder 240, the tone adjuster 250, and the Gaussian filter 260, fewer or additional operators can be included in the ISP 220 in other examples without departing from the scope of the systems and techniques described herein.

The imaging system 200A can input image data into the trained machine learning system 210. The image data input into the trained machine learning system 210 can either be the raw image data 205 or demosaiced image data that is generated by the demosaicing engine 225 from the raw image data 205. In some examples, the imaging system 200A can also input at least some of the metadata 270 into the trained machine learning system 210. The trained machine learning system 210 can include one or more trained convolutional neural networks (CNNs), one or more CNNs, one or more trained neural networks (NNs), one or more NNs, one or more trained support vector machines (SVMs), one or more SVMs, one or more trained random forests, one or more random forests, one or more trained decision trees, one or more decision trees, one or more trained gradient boosting algorithms, one or more gradient boosting algorithms, one or more trained regression algorithms, one or more regression algorithms, or a combination thereof. In some examples, the trained machine learning system 210 includes one or more trained machine learning models 215. In some examples, the trained machine learning models 215 include one or more trained neural networks (NNs). Examples of one or more trained NNs include the neural network 400 of FIG. 4 and the neural network 520 of FIG. 5 described herein.

The trained machine learning system 210 can output settings 275 for each of the parameters of each of the operators of the ISP 220 based on input of the image data (and, in some cases, the metadata 270) to the trained machine learning system 210. Each of the settings 275 generated by the trained machine learning system 210 can correspond to one of the parameters of one of the operators of the ISP 220. For example, the settings 275 generated by the trained machine learning system 210 can include settings for each of the red channel gain parameter, the green channel gain parameter, and the blue channel gain parameter of the multiplier 230. In particular, the settings 275 can include a gain setting 235A for the red channel gain parameter, gain setting 235B for the green channel gain parameter, and a gain setting 235C for the blue channel gain parameter. The settings 275 generated by the trained machine learning system 210 can include settings for each of the red channel offset parameter, the green channel offset parameter, and the blue channel offset parameter of the multiplier 230. In particular, the settings 275 can include an offset setting 245A for the red channel offset parameter, an offset setting 245B for the green channel offset parameter, and an offset setting 245C for the blue channel offset parameter. The settings 275 generated by the trained machine learning system 210 can include a gamma setting 255 for the gamma parameter. The settings 275 generated by the trained machine learning system 210 can include settings for each of the four Gaussian filter parameters (e.g., that can define a shape of a Gaussian curve). In particular, the settings 275 can include a first Gaussian filter setting 265A (e.g., a first eigenvalue of the Gaussian covariance matrix), a second Gaussian filter setting 265B (e.g., a second eigenvalue of the Gaussian covariance matrix), a third Gaussian filter setting 265C (e.g., the angle x to parameterize the direction of the eigenvectors), and a fourth Gaussian filter setting 265D (e.g., the sharpening factor y).

The imaging system 200A feeds the settings 275 into the corresponding operators of the ISP 220 to control adjustment of the image data to generate the output image 280A. For example, the multiplier 230 adjusts the gain of the image data according to the red channel gain parameter being set to the red channel gain setting 235A, the green channel gain parameter being set to the green channel gain setting 235B, and the blue channel gain parameter being set to the blue channel gain setting 235C. The adder 240 adjusts the offsets of the image data according to the red channel offset parameter being set to the red channel offset setting 245A, the green channel offset parameter being set to the green channel offset setting 245B, and the blue channel offset parameter being set to the blue channel offset setting 245C. The tone adjuster 250 adjusts the tone of the image data according to the gamma parameter being set to the gamma setting 255. The Gaussian filter 260 applies a 5×5 Gaussian blur to the image data according to the Gaussian filter parameters being set to the first Gaussian filter setting 265A, the second Gaussian filter setting 265B, the third Gaussian filter setting 265C, and the fourth Gaussian filter setting 265D.

In some examples, the demosaicing engine 225 may also include one or more demosaicing parameters that control demosaicing of the raw image data 205, and the settings 275 generated by the trained machine learning system 210 (based on input of the raw image data 205 and/or the metadata 270 into the trained machine learning system 210) may include one or more settings for the one or more demosaicing parameters for the demosaicing engine 225.

In some examples, the trained machine learning system 210 may include a separate trained machine learning models 215 for generating each of the settings 275. In some examples, one of the trained machine learning models 215 can generate multiple related settings of the settings 275. For instance, one of the trained machine learning models 215 can generate at least a subset of the three gain settings 235A-235C, one of the trained machine learning models 215 can generate at least a subset of the three offset settings 245A-245C, one of the trained machine learning models 215 can generate at least a subset of the four Gaussian filter settings 265A-265D, and/or one of the trained machine learning models 215 can generate at least a subset of the demosaicing settings (not pictured). In some examples, one of the trained machine learning models 215 can generate multiple unrelated settings of the settings 275. For instance, one of the trained machine learning models 215 can generate one or more of the gain settings 235A-235C, one or more of the offset settings 245A-245C, the gamma setting 255, one or more of the Gaussian filter settings 265A-265D, one or more of the demosaicing settings (not pictured), or a combination thereof.

In some examples, the settings 275 may be spatially varying across the raw image data 205, across the demosaiced image data, and/or across the output image 280A. In some examples, the imaging system 200A may generate different settings 275 for different regions of the image data (e.g., of the raw image data 205 or the demosaiced image data). In some examples, the imaging system 200A may generate different settings 275 for each pixel of the image data (e.g., of the raw image data 205 or the demosaiced image data).

In some examples, certain operators illustrated as part of the ISP 220 of FIG. 2A may be missing from the ISP 220. For example, the multiplier 230, the adder 240, the tone adjuster 250, and/or the Gaussian filter 260 may be missing from the ISP 220. In some examples, certain parameters illustrated as part of the ISP 220 of FIG. 2A may be missing. In some examples, certain parameters illustrated as part of the ISP 220 of FIG. 2A may be combined, for instance to apply to multiple color channels rather than just one (e.g., the gain parameters or the offset parameters). In some examples certain parameters illustrated as part of the ISP 220 of FIG. 2A as applying to multiple color channels may be split up to include separate parameters for each color channel (e.g., the gamma parameter and/or the Gaussian filter parameters).

Figure 2B:
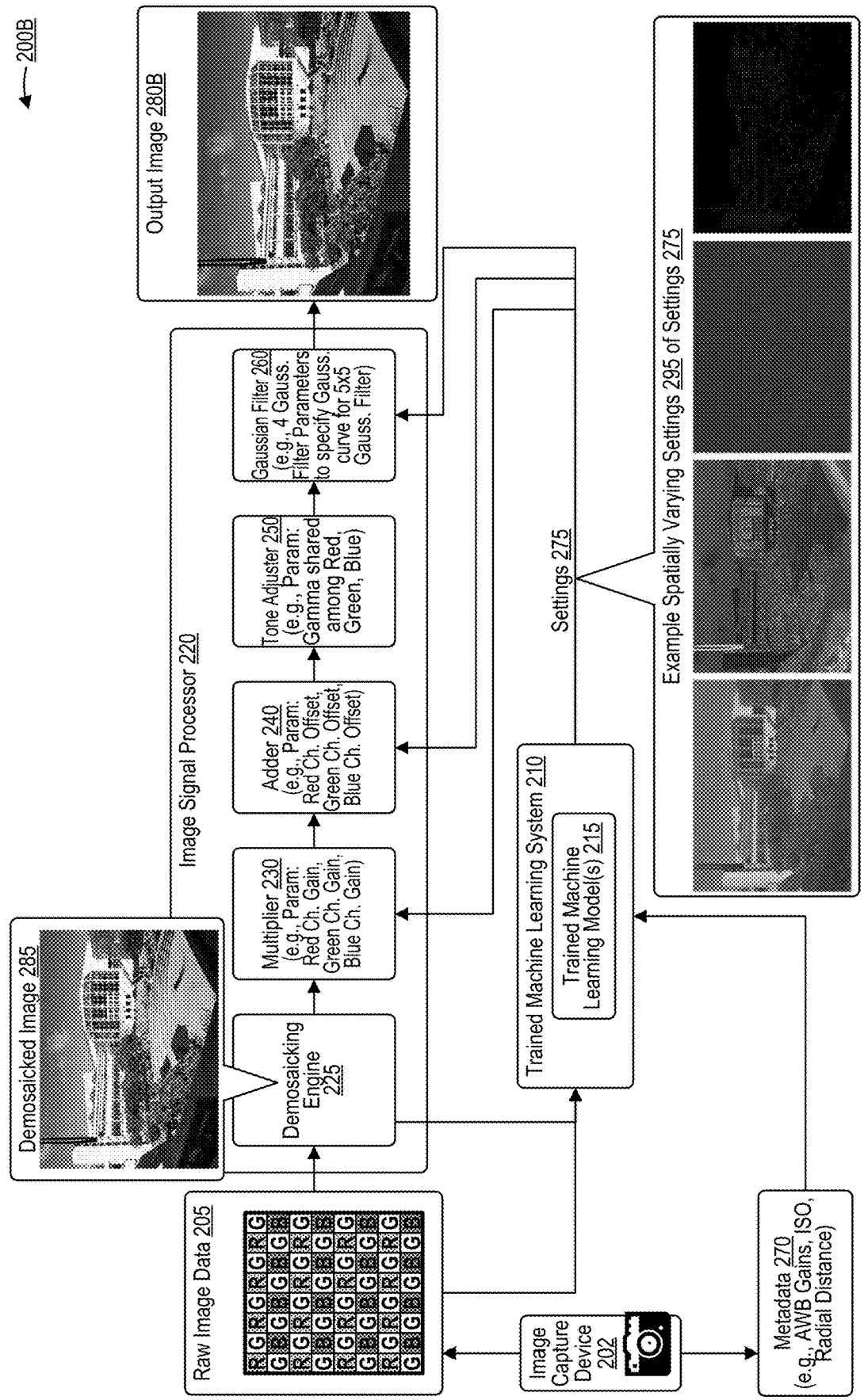
FIG. 2B is a block diagram illustrating an imaging system with examples of a demosaiced image, spatially varying settings, and an output image, in accordance with some examples.

In some examples, the operators illustrated as part of the ISP 220 of FIG. 2A and/or other operators may be rearranged into a different order than the order illustrated in FIG. 2A and FIG. 2B. For example, the adder 240 may be before the multiplier 230, the tone adjuster 250, and/or the Gaussian filter 260. The tone adjuster 250 may be before the multiplier 230, adder 240, and/or the Gaussian filter 260. The Gaussian filter 260 may be before the multiplier 230, adder 240, and/or the tone adjuster 250.

FIG. 2B is a block diagram illustrating an imaging system 200B with examples of a demosaiced image 285, spatially varying settings 295, and an output image 280B, in accordance with some examples. The imaging system 200B of FIG. 2B is similar to the imaging system 200A. The output image 280B and the demosaiced image 285 of FIG. 2B illustrate a building with a large segmented window. The output image 280B appears sharper and clearer than the demosaiced image 285 in certain areas, for example including slightly darker sky and ground areas. Further, colors are more natural in the output image 280B and can be very different in the demosaiced image 285, as the demosaiced image 285 represents raw pixels captured by the sensor (e.g., they are not visible in the gray-scale image). As used herein, the term demosaiced image data may refer to the demosaiced image 285 or a portion thereof. The demosaiced image 285 may be output by the demosaicing engine 225 to the trained machine learning system 210. The demosaiced image 285 may be output by the demosaicing engine 225 to the other operators of the ISP 220 (e.g., to the multiplier 230, the adder 240, the tone adjuster 250, and/or the Gaussian filter 260). Examples of spatially varying settings 295 of the settings 275 are illustrated in FIG. 2B, and include four tuning maps. Each of the four tuning maps of the spatially varying settings 295 include different settings for each pixel of the image data (of the raw image data 205, of the demosaiced image 285, and/or of the output image 280B). The values of the different settings are illustrated in the spatially varying settings 295 as different shades of grey. In some examples, darker shades of grey in the spatially varying settings 295 may correspond to higher values for individual settings, while lighter shades of grey in the spatially varying settings 295 may correspond to lower values for individual settings. In some examples, darker shades of grey in the spatially varying settings 295 may correspond to lower values for individual settings, while lighter shades of grey in the spatially varying settings 295 may correspond to higher values for individual settings.

FIG. 3A is a conceptual diagram illustrating an example of an input image 302 that includes a plurality of pixels labeled P0 through P63, in accordance with some examples. The input image is 7 pixels wide and 7 pixels in height. The pixels are numbered sequentially from P0 to P63 from left to right within each row, starting from the top row and counting up toward the bottom row.

FIG. 3B is a conceptual diagram illustrating an example of a tuning map 303 mapping spatially varying settings corresponding to each of the pixels of the input image 302 of FIG. 3A, in accordance with some examples. The spatially varying settings include a plurality of values labeled V0 through V63. The spatially varying settings are illustrated as a tuning map 303 that is 7 cells (pixels) wide and 7 cells (pixels) in height. The cells are numbered sequentially from V0 to V63 from left to right within each row, starting from the top row and counting up toward the bottom row.

Each value in each cells of the tuning map 303 corresponds to a pixel in the input image 302. For example, the value V0 in the tuning map 303 corresponds to the pixel P0 in the input image 302. A value in the tuning map 303 is used to adjust or modify its corresponding pixel in the input image 302 based on one of the parameters of one of the operators of the ISP 220. For example, each value in the tuning map 303 may indicate a gain setting 235A for the red channel gain parameter, a gain setting 235B for the green channel gain parameter, a gain setting 235C for the blue channel gain parameter, an offset setting 245A for the red channel offset parameter, an offset setting 245B for the green channel offset parameter, an offset setting 245C for the blue channel offset parameter, a gamma setting 255 for the gamma parameter, a first Gaussian filter setting 265A for a first Gaussian filter parameter, a second Gaussian filter setting 265B for a second Gaussian filter parameter, a third Gaussian filter setting 265C for a third Gaussian filter parameter, a fourth Gaussian filter setting 265D for a fourth Gaussian filter parameter, one or more demosaicing parameters for one or more demosaicing parameters, or a combination thereof. In some examples, each value in the tuning map 303 indicates a strength or an amount of an image processing function to apply to the corresponding pixel. For example, a first value (e.g., a value of 0, a value of 1, or other value) for V0 in the tuning map 303 can indicate that the image processing function of the tuning map is to be applied at a strength of zero (will not be applied at all) to the corresponding pixel P0 in the input image 302. In another example, a second value (e.g., a value of 0, a value of 1, or other value) for V15 in the tuning map 303 indicates that the image processing function is be applied at a maximum strength (a maximum amount of the image processing function) to the corresponding pixel P15 in the input image 302. Values in different types of tuning maps can indicate different levels of applicability of the respective image processing functions.

The operators of the ISP 220 can apply settings according to the tuning map 300 to the input image 302. The tuning map 303 can be generated by the trained machine learning system 210 based on the image data (the raw image data 205 or the demosaiced image 285) and/or the metadata 270.

Figure 4:
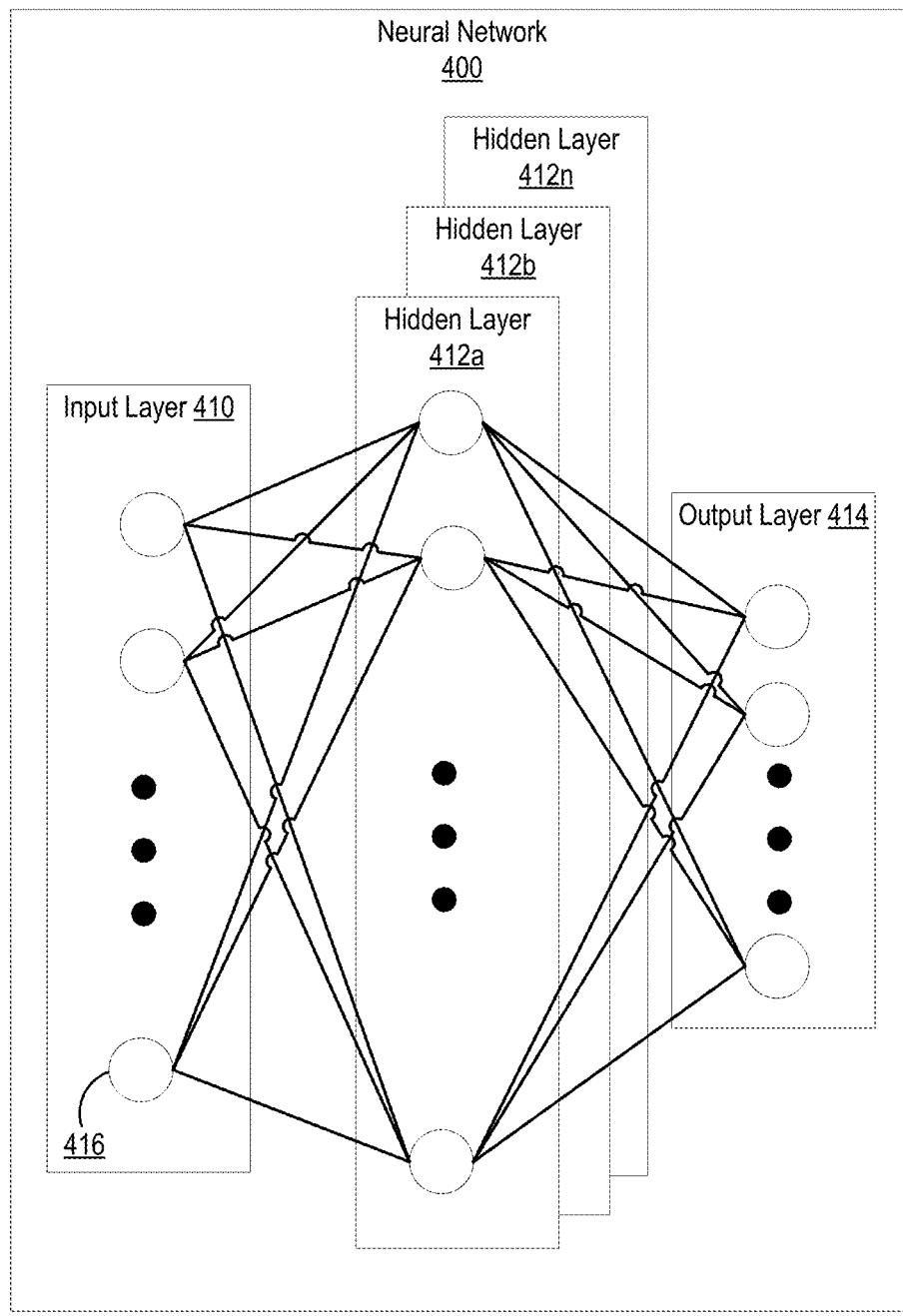
FIG. 4 is a block diagram illustrating an example of a neural network that can be used by the trained machine learning system that generates the settings used by the image signal processor (ISP), in accordance with some examples.

FIG. 4 is a block diagram illustrating an example of a neural network that can be used by the trained machine learning system that generates the settings used by the image signal processor (ISP), in accordance with some examples. The neural network 400 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 400 may be an example of one of the one or more trained machine learning models 215 (e.g., one or more trained neural networks or other machine learning models) of the trained machine learning system 210.

An input layer 410 of the neural network 400 includes input data. The input data of the input layer 410 can include data representing the pixels of an input image frame. In an illustrative example, the input data of the input layer 410 can include data representing the pixels of image data (e.g., the raw image data 205 and/or the demosaiced image 285 and/or the input image 302) and/or metadata corresponding to the image data (e.g., metadata 270). In one illustrative example, the input data of the input layer 410 can include the raw image data 205 and/or metadata 270. In another illustrative example, the input data of the input layer 410 can include the demosaiced image 285 and/or metadata 270. The images can include image data from an image sensor including raw pixel data (including a single color per pixel based, for example, on a Bayer filter) or processed pixel values (e.g., RGB pixels of an RGB image). The neural network 400 includes multiple hidden layers 412a, 412b, through 412n. The hidden layers 412a, 412b, through 412n include "n" number of hidden layers, where "n" is an integer greater than or equal to one. The number of hidden layers can be made to include as many layers as needed for the given application. The neural network 400 further includes an output layer 414 that provides an output resulting from the processing performed by the hidden layers 412a, 412b, through 412n. In some examples, the output layer 414 can provide one or more settings, such as any of the settings 275. In an illustrative example, the output layer 414 can provide one or more tuning maps 303, as in the four exemplary tuning maps of the spatially varying settings 295.

The neural network 400 is a multi-layer neural network of interconnected filters. Each filter can be trained to learn a feature representative of the input data. In some cases, the neural network 400 can include a feed-forward network, in which case there are no feedback connections where outputs of the network are fed back into itself. In some cases, the network 400 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 410 can activate a set of nodes in the first hidden layer 412a. For example, as shown, each of the input nodes of the input layer 410 can be connected to each of the nodes of the first hidden layer 412a. The nodes of a hidden layer can transform the information of each input node by applying activation functions (e.g., filters) to this information. The information derived from the transformation can then be passed to and can activate the nodes of the next hidden layer 412b, which can perform their own designated functions. Example functions include convolutional functions, downscaling, upscaling, data transformation, and/or any other suitable functions. The output of the hidden layer 412b can then activate nodes of the next hidden layer, and so on. The output of the last hidden layer 412n can activate one or more nodes of the output layer 414, which provides a processed output image. In some cases, while nodes (e.g., node 416) in the neural network 400 are shown as having multiple output lines, a node has a single output and all lines shown as being output from a node represent the same output value.

In some cases, each node or interconnection between nodes can have a weight that is a set of parameters derived from the training of the neural network 400. For example, an interconnection between nodes can represent a piece of information learned about the interconnected nodes. The interconnection can have a tunable numeric weight that can be set (e.g., based on a training dataset), allowing the neural network 400 to be adaptive to inputs and able to learn as more and more data is processed.

The neural network 400 is pre-trained to process the features from the data in the input layer 410 using the different hidden layers 412a, 412b, through 412n in order to provide the output through the output layer 414.

Figure 5:
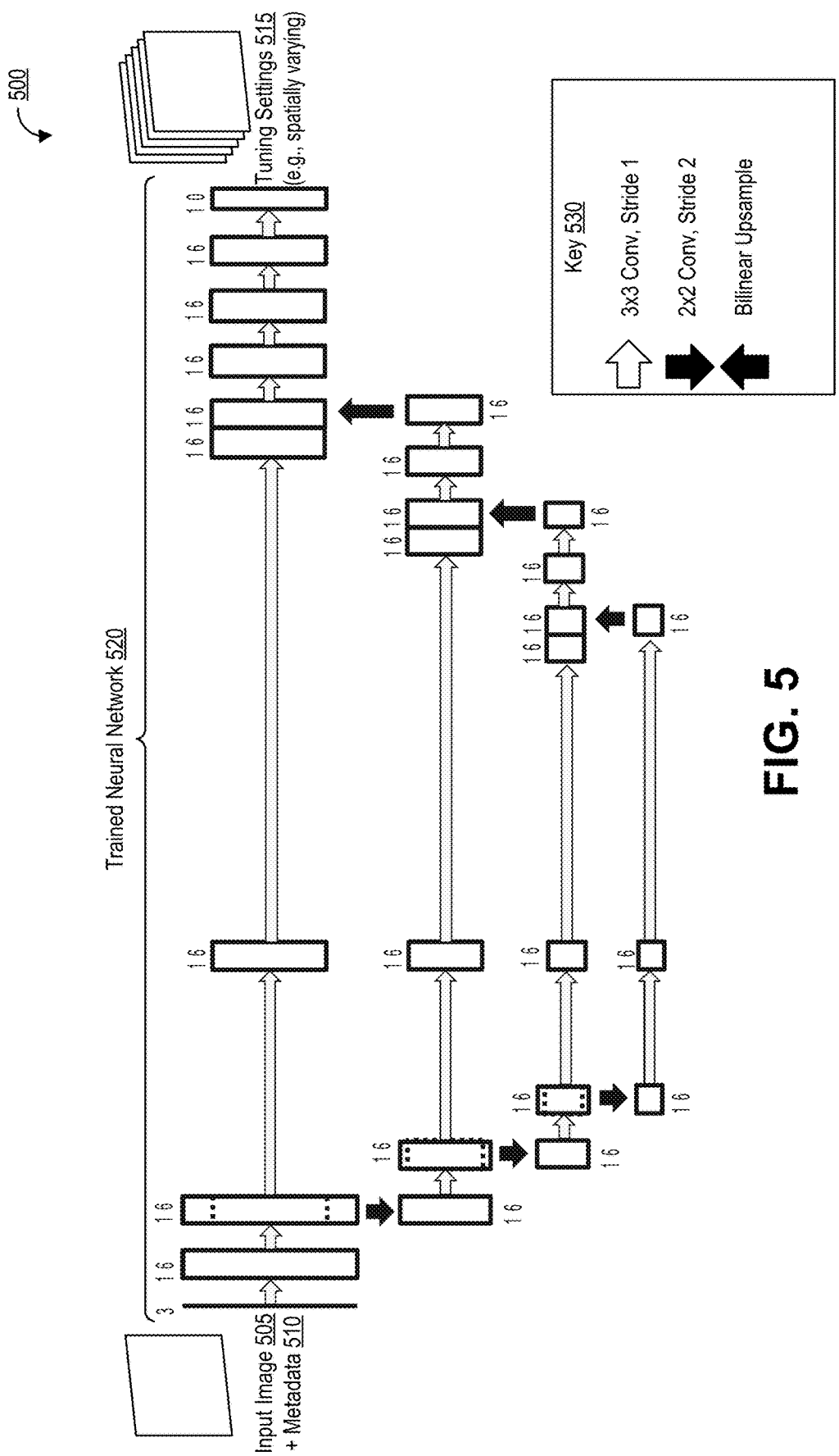
FIG. 5 is a block diagram illustrating an example of a neural network architecture of a trained neural network of the trained machine learning system, in accordance with some examples.

FIG. 5 is a block diagram illustrating an example of a neural network architecture 500 of a trained neural network 520 of the trained machine learning system 210, in accordance with some examples. The trained neural network 520 may be an example of one of the one or more trained neural networks 215 of the trained machine learning system 210. The neural network architecture 500 receives, as its input, an input image 505 and metadata 510. The input image 505 may include raw image data, such as the raw image data 205. The raw image data may correspond to an entire image or an image patch representing a region of an entire image. The input image 505 may include demosaiced image data, such as the demosaiced image 285 or an image patch representing a region of the demosaiced image 285. An example of the metadata 510 may include the metadata 270.

The trained neural network 520 outputs settings 515. The trained neural network 520 may output settings 515 in the form of one or more tuning maps, as in the tuning map 303 of FIG. 3B or the four exemplary tuning maps of the spatially varying settings 295 of FIG. 2B. The trained neural network 520 may output settings 515 as individual values, which may be listed in a list, matrix, and/or grid.

A key 530 identifies different NN operations performed by the trained NN 520 to generate the settings 515 based on the input image 505 and/or the metadata 510. For instance, convolutions with 3×3 filters and a stride of 1 are indicated by a thick white arrow outlined in black and pointing to the right. Convolutions with 2×2 filters and a stride of 2 are indicated by a thick black arrow pointing downward. Upsampling (e.g., bilinear upsampling) is indicated by a thick black arrow pointing upward.

Figure 6:
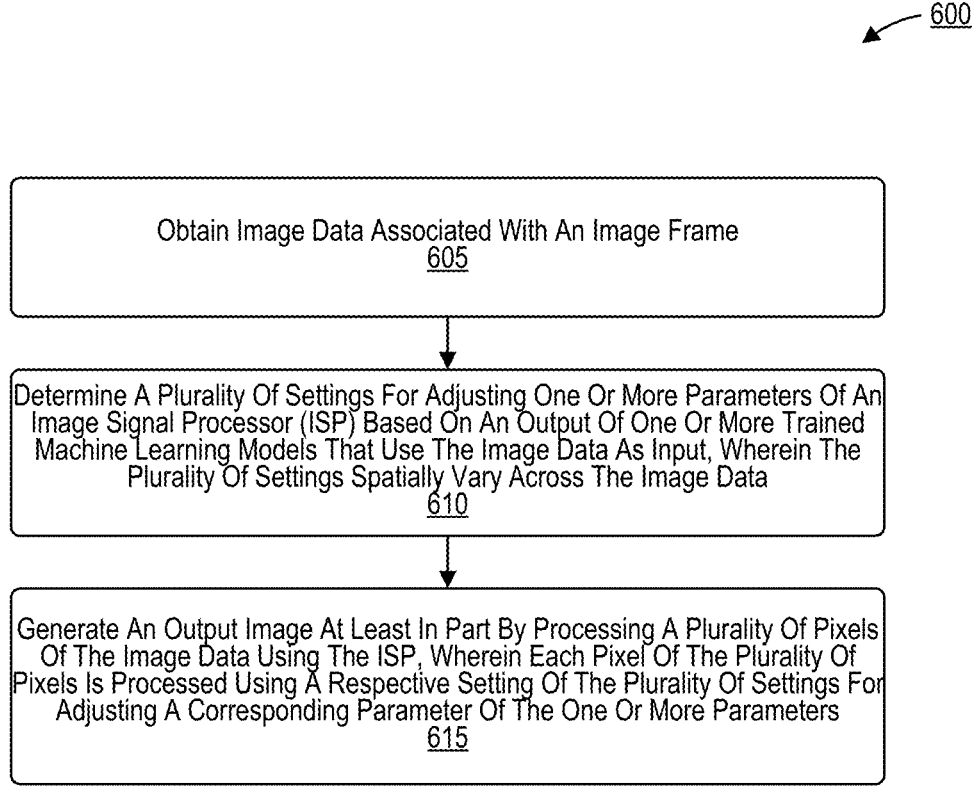
FIG. 6 is a flow diagram illustrating operations for processing image data, in accordance with some examples.

FIG. 6 is a flow diagram illustrating operations of a process 600 for processing image data. The operations of the process 600 may be performed by an imaging system. In some examples, the imaging system that performs the operations can be the imaging system 200A. In some examples, the imaging system that performs the operations can be the imaging system 200B. In some examples, the imaging system that performs the operations of the process 600 can include, for example, one or more means for performing the operations, which can include the image capture and processing system 100, the image capture device 105A, the image processing device 105B, the image processor 150, the ISP 154, the host processor 152, the imaging system 200A, the imaging system 200B, the ISP 220, the trained machine learning system 210, the image capture device 202, the demosaicing engine 225, the multiplier 230, the adder 240, the tone adjuster 250, the Gaussian filter 260, the neural network 400, the neural network architecture 500, the trained neural network 520, a computing system 700, or a combination thereof.

At operation 605, the process 600 includes obtaining image data associated with an image frame. In some cases, the image data includes demosaiced image data. For instance, to generate the output image in some examples, the process 600 can include demosaicing the image data before processing the plurality of pixels of the image data using the ISP with each of the one or more parameters adjusted based on the plurality of settings. In some examples, the process 600 can include demosaicing the image data before input of the image data to the one or more trained machine learning models. In some cases, the image data is raw image data having a plurality of color components corresponding to a color filter array (e.g., a Bayer filter) of an image sensor. For example, input of the image data to the one or more trained machine learning models can include input of the raw image data to the one or more trained machine learning models. An example of raw image data 205 is shown in FIG. 2A and FIG. 2B and is discussed above. In some aspects, to obtain the image data, the process 600 can include receiving the image data from an image sensor (e.g., image sensor 130 of FIG. 1) that captures the image data (e.g., raw image data).

In some examples, the process 600 can include obtaining metadata corresponding to the image data. In such examples, the output of the one or more trained machine learning models is based on input of the metadata and the image data to the one or more trained machine learning models. In some cases, the metadata can include automatic white balance (AWB), analog gain, digital gain, ISO, radial distance, other metadata, any combination thereof, and/or other information.

At operation 610, the process 600 includes determining a plurality of settings for adjusting one or more parameters of an image signal processor (ISP) based on an output of one or more trained machine learning models that use the image data as input. In some aspects, the one or more trained machine learning models include one or more trained neural networks. The plurality of settings spatially vary across the image data. In some examples, the one or more parameters of the ISP are associated with at least one of noise reduction, sharpening, tone mapping, color saturation, any combination thereof, and/or other parameters.

At operation 615, the process 600 includes generating an output image at least in part by processing a plurality of pixels of the image data using the ISP. Each pixel of the plurality of pixels is processed using a respective setting of the plurality of settings for adjusting a corresponding parameter of the one or more parameters. As noted above, the plurality of settings spatially vary across the image data, in which case different settings from the plurality of settings can be applied to a same pixel of the image data (e.g., a single frame or image) and/or to separate pixels of the image data (e.g., the same single frame or image). For example, to process the plurality of pixels of the image data using the ISP with each of the one or more parameters adjusted based on the plurality of settings, the process 600 can include processing a first pixel of the plurality of pixels of the image data based on a first setting (from the plurality of settings that spatially vary across the image data) for a first parameter of the one or more parameters. The process 600 can further include processing a second pixel of the plurality of pixels of the image data based on a second setting (from the plurality of settings) for the first parameter. In another example, to process the plurality of pixels of the image data using the ISP with each of the one or more parameters adjusted based on the plurality of settings, the process 600 can include processing a first pixel of the plurality of pixels of the image data based on a first setting (from the plurality of settings) for a first parameter of the one or more parameters. The process 600 can further include processing the first pixel of the plurality of pixels based on a second setting (from the plurality of settings) corresponding to a second parameter of the one or more parameters.

In some examples, the one or more parameters of the ISP include a plurality of gain parameters and the plurality of settings include a plurality of gain settings corresponding to the plurality of gain parameters. In such examples, each gain parameter of the plurality of gain parameters can correspond to one of a plurality of color channels. The process 600 can process the plurality of pixels of the image data using the ISP at least in part by performing one or more multiplier operations for at least one pixel based on the plurality of gain settings. The multiplier operations can be performed for the at least one pixel using the ISP with the plurality of gain settings.

In some examples, the one or more parameters of the ISP include a plurality of offset parameters and the plurality of settings include a plurality of offset settings corresponding to the plurality of offset parameters. In such examples, each offset parameter of the plurality of offset parameters can correspond to one of a plurality of color channels. The process 600 can process the plurality of pixels of the image data using the ISP at least in part by performing one or more addition operations for at least one pixel based on the plurality of offset settings. The one or more addition operations can be performed for the at least one pixel using the ISP with the plurality of offset settings.

In some examples, the one or more parameters of the ISP include one or more gamma parameters and the plurality of settings include one or more gamma settings corresponding to the one or more gamma parameters. The process 600 can process the plurality of pixels of the image data using the ISP at least in part by adjusting a tone of at least one pixel based on the one or more gamma settings. The tone can be adjusted for the at least one pixel using the ISP with the one or more gamma settings.

In some examples, the one or more parameters of the ISP include one or more Gaussian filter parameters and the plurality of settings include one or more Gaussian filter settings corresponding to the one or more Gaussian filter parameters. The process 600 can process the plurality of pixels of the image data using the ISP at least in part by applying a Gaussian filter to at least one pixel based on a Gaussian curve. A shape of the Gaussian curve is based on the one or more Gaussian filter settings.

In some examples, the one or more parameters of the ISP include one or more demosaicing parameters and the plurality of settings include one or more demosaicing settings corresponding to the one or more demosaicing parameters. The process 600 can process the plurality of pixels of the image data using the ISP at least in part by demosaicing at least one pixel of the image data based on the one or more demosaicing settings.

In some examples, the process 600 can include displaying the output image on one or more displays (e.g., of an apparatus or device performing the process 600, of an external device that is external with respect to an apparatus or device performing the process 600, etc.). In some examples, the process 600 can include storing the output image in a storage device (e.g., of an apparatus or device performing the process 600, of remote storage that is remote with respect to an apparatus or device performing the process 600 and that is accessible via a wired or wireless network, etc.).

In some examples, the processes described herein (e.g., the process 600 and/or other processes described herein) may be performed by a computing device or apparatus. In some examples, the process 600 can be performed by the imaging system 200A and/or the imaging system 200B. In some examples, the process 600 can be performed by a computing device with the computing system 700 shown in FIG. 7. For instance, a computing device with the computing system 700 shown in FIG. 7 can include at least some of the components of the imaging system 200A and/or the imaging system 200B, and/or can implement the operations of the process 600 of FIG. 6.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 600. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
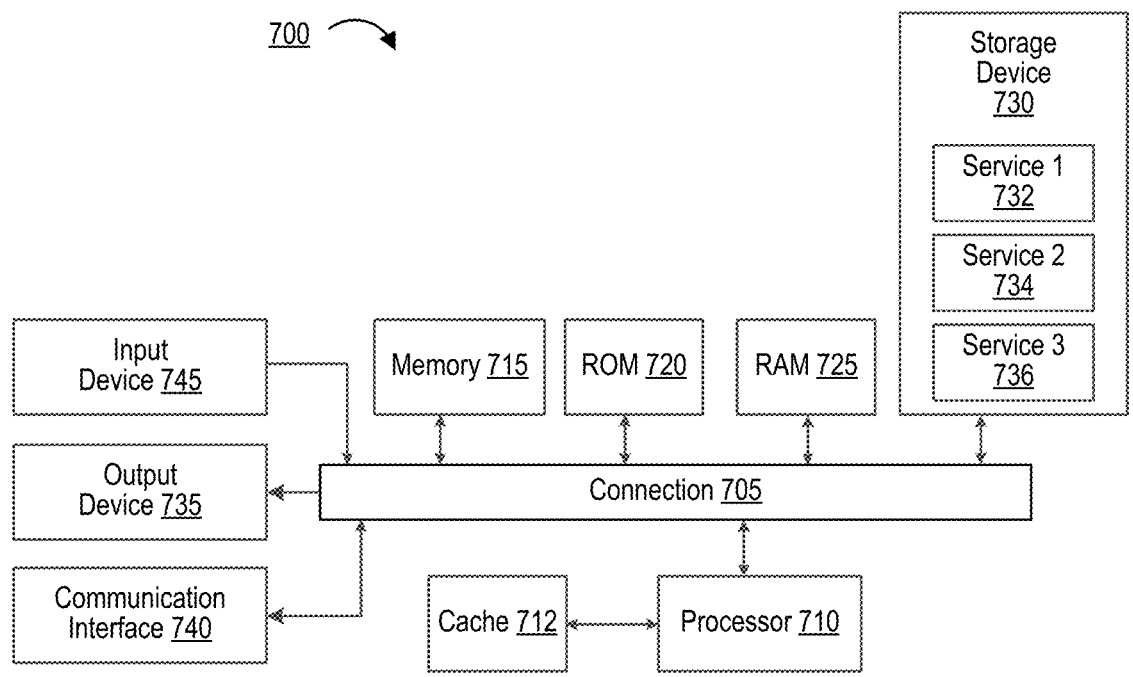
FIG. 7 is a diagram illustrating an example of a computing system for implementing certain aspects described herein.

FIG. 7 is a diagram illustrating an example of a system for implementing certain aspects of the present technology. In particular, FIG. 7 illustrates an example of computing system 700, which can be for example any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials.

The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for processing image data, the apparatus comprising: a memory; and one or more processors coupled to the memory, the one or more processors configured to: obtain image data associated with an image frame; determine a plurality of settings for adjusting one or more parameters of an image signal processor (ISP) based on an output of one or more trained machine learning models that use the image data as input, wherein the plurality of settings spatially vary across the image data; and generate an output image at least in part by processing a plurality of pixels of the image data using the ISP, wherein each pixel of the plurality of pixels is processed using a respective setting of the plurality of settings for adjusting a corresponding parameter of the one or more parameters.

Aspect 2: The apparatus of Aspect 1, wherein the plurality of settings include one or more tuned settings.

Aspect 3: The apparatus of any of Aspects 1 or 2, wherein the image data includes demosaiced image data.

Aspect 4: The apparatus of any of Aspects 1 to 3, wherein the image data is raw image data having a plurality of color components corresponding to a color filter array of an image sensor.

Aspect 5: The apparatus of Aspect 4, wherein input of the image data to the one or more trained machine learning models includes input of the raw image data to the one or more trained machine learning models.

Aspect 6: The apparatus of any of Aspects 1 to 5, wherein, to generate the output image, the one or more processors are configured to: demosaic the image data before processing the plurality of pixels of the image data using the ISP with each of the one or more parameters adjusted based on the plurality of settings.

Aspect 7: The apparatus of any of Aspects 1 to 6, wherein the one or more processors are configured to: demosaic the image data before input of the image data to the one or more trained machine learning models.

Aspect 8: The apparatus of any of Aspects 1 to 7, wherein, to obtain the image data, the one or more processors are configured to receive the image data from an image sensor that captures the image data.

Aspect 9: The apparatus of any of Aspects 1 to 8, wherein the one or more processors are configured to: obtain metadata corresponding to the image data, wherein the output of the one or more trained machine learning models is based on input of the metadata and the image data to the one or more trained machine learning models.

Aspect 10: The apparatus of any of Aspects 1 to 9, wherein the one or more parameters of the ISP include a plurality of gain parameters and the plurality of settings include a plurality of gain settings corresponding to the plurality of gain parameters, each gain parameter of the plurality of gain parameters corresponding to one of a plurality of color channels, wherein, to process the plurality of pixels of the image data using the ISP, the ISP is configured to perform one or more multiplier operations for at least one pixel based on the plurality of gain settings.

Aspect 11: The apparatus of any of Aspects 1 to 10, wherein the one or more parameters of the ISP include a plurality of offset parameters and the plurality of settings include a plurality of offset settings corresponding to the plurality of offset parameters, each offset parameter of the plurality of offset parameters corresponding to one of a plurality of color channels, wherein, to process the plurality of pixels of the image data using the ISP, the ISP is configured to perform one or more addition operations for at least one pixel based on the plurality of offset settings.

Aspect 12: The apparatus of any of Aspects 1 to 11, wherein the one or more parameters of the ISP include one or more gamma parameters and the plurality of settings include one or more gamma settings corresponding to the one or more gamma parameters, wherein, to process the plurality of pixels of the image data using the ISP, the ISP is configured to adjust tone of at least one pixel based on the one or more gamma settings.

Aspect 13: The apparatus of any of Aspects 1 to 12, wherein the one or more parameters of the ISP include one or more Gaussian filter parameters and the plurality of settings include one or more Gaussian filter settings corresponding to the one or more Gaussian filter parameters, wherein, to process the plurality of pixels of the image data using the ISP, the ISP is configured to apply a Gaussian filter to at least one pixel based on a Gaussian curve, wherein a shape of the Gaussian curve is based on one or more Gaussian settings.

Aspect 14: The apparatus of any of Aspects 1 to 13, wherein the one or more parameters of the ISP include one or more demosaicing parameters and the plurality of settings include one or more demosaicing settings corresponding to the one or more demosaicing parameters, wherein, to process the plurality of pixels of the image data using the ISP, the ISP is configured to demosaic at least one pixel of the image data based on the one or more demosaicing settings.

Aspect 15: The apparatus of any of Aspects 1 to 14, wherein the one or more parameters of the ISP are associated with at least one of noise reduction, sharpening, tone mapping, and color saturation.

Aspect 16: The apparatus of any of Aspects 1 to 15, wherein, to process the plurality of pixels of the image data using the ISP with each of the one or more parameters adjusted based on the plurality of settings, the one or more processors are configured to: process a first pixel of the plurality of pixels of the image data based on a first setting for a first parameter of the one or more parameters; and process a second pixel of the plurality of pixels of the image data based on a second setting for the first parameter, wherein the plurality of settings include at least the first setting and the second setting.

Aspect 17: The apparatus of any of Aspects 1 to 16, wherein, to process the plurality of pixels of the image data using the ISP with each of the one or more parameters adjusted based on the plurality of settings, the one or more processors are configured to: process a first pixel of the plurality of pixels of the image data based on a first setting for a first parameter of the one or more parameters; and process the first pixel of the plurality of pixels based on a second setting corresponding to a second parameter of the one or more parameters, wherein the plurality of settings include at least the first setting and the second setting.

Aspect 18: The apparatus of any of Aspects 1 to 17, further comprising: one or more displays, wherein the one or more processors are configured to display the output image on the one or more displays.

Aspect 19: The apparatus of any of Aspects 1 to 18, wherein the one or more trained machine learning models include one or more trained neural networks.

Aspect 20: A method of processing image data, comprising: obtaining image data associated with an image frame; determining a plurality of settings for adjusting one or more parameters of an image signal processor (ISP) based on an output of one or more trained machine learning models that use the image data as input, wherein the plurality of settings spatially vary across the image data; and generating an output image at least in part by processing a plurality of pixels of the image data using the ISP, wherein each pixel of the plurality of pixels is processed using a respective setting of the plurality of settings for adjusting a corresponding parameter of the one or more parameters.

Aspect 21: The method of Aspect 20, wherein the plurality of settings include one or more tuned settings.

Aspect 22: The method of any of Aspects 20 or 21, wherein the image data includes demosaiced image data.

Aspect 23: The method of any of Aspects 20 to 22, wherein the image data is raw image data having a plurality of color components corresponding to a color filter array of an image sensor.

Aspect 24: The method of Aspect 23, wherein input of the image data to the one or more trained machine learning models includes input of the raw image data to the one or more trained machine learning models.

Aspect 25: The method of any of Aspects 20 to 24, wherein generating the output image includes: demosaicing the image data before processing the plurality of pixels of the image data using the ISP with each of the one or more parameters adjusted based on the plurality of settings.

Aspect 26: The method of any of Aspects 20 to 25, further comprising demosaicing the image data before input of the image data to the one or more trained machine learning models.

Aspect 27: The method of any of Aspects 20 to 26, wherein obtaining the image data includes receiving the image data from an image sensor that captures the image data.

Aspect 28: The method of any of Aspects 20 to 27, further comprising: obtaining metadata corresponding to the image data, wherein the output of the one or more trained machine learning models is based on input of the metadata and the image data to the one or more trained machine learning models.

Aspect 29: The method of any of Aspects 20 to 28, wherein the one or more parameters of the ISP include a plurality of gain parameters and the plurality of settings include a plurality of gain settings corresponding to the plurality of gain parameters, each gain parameter of the plurality of gain parameters corresponding to one of a plurality of color channels, and wherein processing the plurality of pixels of the image data using the ISP includes performing, using the ISP, one or more multiplier operations for at least one pixel based on the plurality of gain settings.

Aspect 30: The method of any of Aspects 20 to 29, wherein the one or more parameters of the ISP include a plurality of offset parameters and the plurality of settings include a plurality of offset settings corresponding to the plurality of offset parameters, each offset parameter of the plurality of offset parameters corresponding to one of a plurality of color channels, and wherein processing the plurality of pixels of the image data using the ISP includes performing, using the ISP, one or more addition operations for at least one pixel based on the plurality of offset settings.

Aspect 31: The method of any of Aspects 20 to 30, wherein the one or more parameters of the ISP include one or more gamma parameters and the plurality of settings include one or more gamma settings corresponding to the one or more gamma parameters, and wherein processing the plurality of pixels of the image data using the ISP includes adjusting, using the ISP, tone of at least one pixel based on the one or more gamma settings.

Aspect 32: The method of any of Aspects 20 to 31, wherein the one or more parameters of the ISP include one or more Gaussian filter parameters and the plurality of settings include one or more Gaussian filter settings corresponding to the one or more Gaussian filter parameters, and wherein processing the plurality of pixels of the image data using the ISP includes applying, using the ISP, a Gaussian filter to at least one pixel based on a Gaussian curve, wherein a shape of the Gaussian curve is based on one or more Gaussian settings.

Aspect 33: The method of any of Aspects 20 to 32, wherein the one or more parameters of the ISP include one or more demosaicing parameters and the plurality of settings include one or more demosaicing settings corresponding to the one or more demosaicing parameters, and wherein processing the plurality of pixels of the image data using the ISP includes demosaicing, using the ISP, at least one pixel of the image data based on the one or more demosaicing settings.

Aspect 34: The method of any of Aspects 20 to 33, wherein the one or more parameters of the ISP are associated with at least one of noise reduction, sharpening, tone mapping, and color saturation.

Aspect 35: The method of any of Aspects 20 to 34, wherein processing the plurality of pixels of the image data using the ISP with each of the one or more parameters adjusted based on the plurality of settings includes: processing a first pixel of the plurality of pixels of the image data based on a first setting for a first parameter of the one or more parameters; and process a second pixel of the plurality of pixels of the image data based on a second setting for the first parameter, wherein the plurality of settings include at least the first setting and the second setting.

Aspect 36: The method of any of Aspects 20 to 35, wherein processing the plurality of pixels of the image data using the ISP with each of the one or more parameters adjusted based on the plurality of settings includes: processing a first pixel of the plurality of pixels of the image data based on a first setting for a first parameter of the one or more parameters; and process the first pixel of the plurality of pixels based on a second setting corresponding to a second parameter of the one or more parameters, wherein the plurality of settings include at least the first setting and the second setting.

Aspect 37: The method of any of Aspects 20 to 36, further comprising: displaying the output image on one or more displays.

Aspect 38: The method of any of Aspects 20 to 37, wherein the one or more trained machine learning models include one or more trained neural networks.

Aspect 39: A computer-readable storage medium storing instructions that, when executed by one or more processors, cause the one or more processors to perform operations according to any of Aspects 1 to 38.

Aspect 40: An apparatus comprising means for performing operations according to any of Aspects 1 to 38.

What is claimed is:

1. An apparatus for processing image data, the apparatus comprising:
   at least one memory; and
   at least one processor coupled to the at least one memory, the at least one processor configured to:
     obtain image data having at least a first color channel and a second color channel;
     determine a plurality of settings for adjusting at least one parameter of an image signal processor (ISP) based on an output of at least one trained machine learning model that uses the image data as an input, wherein the plurality of settings include a first setting associated with the first color channel and a second setting associated with the second color channel; and
     process the image data using the ISP to generate an output image frame, wherein the first setting is used to adjust the at least one parameter for the first color channel to process the image data, wherein the second setting is used to adjust the at least one parameter for the second color channel to process the image data.

2. The apparatus of claim 1, wherein the first setting is used to adjust the at least one parameter for the first color channel without using the second setting for the first color channel, wherein the second setting is used to adjust the at least one parameter for the second color channel without using the first setting for the second color channel.

3. The apparatus of claim 1, wherein the image data also has a third color channel, wherein the plurality of settings include a third setting associated with the third color channel, wherein the third setting is used to adjust the at least one parameter for the third color channel to process the image data.

4. The apparatus of claim 3, wherein first color channel is a red color channel, wherein second color channel is a green color channel, and wherein third color channel is a blue color channel.

5. The apparatus of claim 1, wherein first color channel represents a frequency range within a visible light spectrum, wherein the second color channel represents a frequency range outside of the visible light spectrum.

6. The apparatus of claim 1, wherein the plurality of settings spatially vary across different pixels of an image frame associated with the image data.

7. The apparatus of claim 1, the at least one processor configured to:
   demosaic the image data to process the image data using the ISP to generate the output image frame.

8. The apparatus of claim 7, wherein the first color channel corresponds to a first color of a color filter array of an image sensor that captures the image data, wherein the second color channel corresponds to a second color of the color filter array of the image sensor that captures the image data.

9. The apparatus of claim 1, wherein the image data includes demosaiced image data.

10. The apparatus of claim 1, the at least one processor configured to:
    receive the image data from an image sensor to obtain the image data.

11. The apparatus of claim 1, wherein the at least one trained machine learning model also uses metadata associated with the image data as a second input to generate the output.

12. The apparatus of claim 11, wherein the metadata includes at least one image capture setting used to capturing the image data.

13. The apparatus of claim 1, wherein the first setting associated with the first color channel includes a first gain associated with the first color channel, wherein the second setting associated with the second color channel includes a second gain associated with the second color channel.

14. The apparatus of claim 1, wherein the first setting associated with the first color channel includes a first offset associated with the first color channel, wherein the second setting associated with the second color channel includes a second offset associated with the second color channel.

15. The apparatus of claim 1, the at least one processor configured to:
    determine an additional setting for adjusting a second parameter of the image signal processor (ISP), wherein the additional setting is used to adjust the second parameter for both the first color channel and the second color channel to process the image data.

16. The apparatus of claim 15, wherein the second parameter is associated with tone adjustment.

17. The apparatus of claim 15, wherein the second parameter is associated with blurring.

18. The apparatus of claim 1, wherein the at least one parameter is associated with tone adjustment.

19. The apparatus of claim 1, wherein the at least one parameter is associated with color saturation.

20. The apparatus of claim 1, wherein the at least one parameter is associated with blurring.

21. The apparatus of claim 1, the at least one processor configured to:
    further train the at least one trained machine learning model based on at least the output image frame.

22. A method for processing image data, the method comprising:
    obtaining image data having at least a first color channel and a second color channel;
    determining a plurality of settings for adjusting at least one parameter of an image signal processor (ISP) based on an output of at least one trained machine learning model that uses the image data as an input, wherein the plurality of settings include a first setting associated with the first color channel and a second setting associated with the second color channel; and
    processing the image data using the ISP to generate an output image frame, wherein the first setting is used to adjust the at least one parameter for the first color channel to process the image data, wherein the second setting is used to adjust the at least one parameter for the second color channel to process the image data.

23. The method of claim 22, wherein the first setting is used to adjust the at least one parameter for the first color channel without using the second setting for the first color channel, wherein the second setting is used to adjust the at least one parameter for the second color channel without using the first setting for the second color channel.

24. The method of claim 22, wherein the image data also has a third color channel, wherein the plurality of settings include a third setting associated with the third color channel, wherein the third setting is used to adjust the at least one parameter for the third color channel to process the image data.

25. The method of claim 22, wherein the plurality of settings spatially vary across different pixels of an image frame associated with the image data.

26. The method of claim 22, further comprising:
    demosaicing the image data to process the image data using the ISP to generate the output image frame.

27. The method of claim 22, further comprising:
    receiving the image data from an image sensor to obtain the image data.

28. The method of claim 22, wherein the at least one trained machine learning model also uses metadata associated with the image data as a second input to generate the output.

29. The method of claim 22, wherein the first setting associated with the first color channel includes a first gain associated with the first color channel, wherein the second setting associated with the second color channel includes a second gain associated with the second color channel.

30. The method of claim 22, wherein the first setting associated with the first color channel includes a first offset associated with the first color channel, wherein the second setting associated with the second color channel includes a second offset associated with the second color channel.

* * * * *